(12) United States Patent
Nakagawa et al.

(10) Patent No.: US 7,583,264 B2
(45) Date of Patent: Sep. 1, 2009

(54) APPARATUS AND PROGRAM FOR IMAGE GENERATION

(75) Inventors: Yoshihiko Nakagawa, Tokyo (JP); Michinari Terada, Tokyo (JP); Daisuke Ogawa, Tokyo (JP)

(73) Assignee: Sega Corporation, Tokyo (JP)

( * ) Notice: Subject to any disclaimer, the term of this patent is extended or adjusted under 35 U.S.C. 154(b) by 419 days.

(21) Appl. No.: 11/512,752

(22) Filed: Aug. 29, 2006

(65) Prior Publication Data

US 2007/0046665 A1    Mar. 1, 2007

(30) Foreign Application Priority Data

Aug. 31, 2005    (JP) ............... 2005-252199

(51) Int. Cl.
*G06T 15/00* (2006.01)
*G06T 15/50* (2006.01)
*G09G 5/00* (2006.01)

(52) U.S. Cl. ....................... 345/426; 345/582
(58) Field of Classification Search ................ 345/426, 345/586, 582
See application file for complete search history.

(56) References Cited

U.S. PATENT DOCUMENTS

| 5,537,638 | A | * | 7/1996 | Morita et al. ............... 345/426 |
| 5,566,283 | A | * | 10/1996 | Modegi et al. ............... 345/426 |
| 6,639,594 | B2 | * | 10/2003 | Zhang et al. ................. 345/426 |
| 2003/0030639 | A1 | * | 2/2003 | Ritter .......................... 345/426 |
| 2003/0080961 | A1 | * | 5/2003 | Blaho .......................... 345/426 |
| 2006/0082577 | A1 | * | 4/2006 | Carter .......................... 345/426 |

FOREIGN PATENT DOCUMENTS

| JP | 09-282481 | 10/1997 |
| JP | 33-80674 | 10/1997 |
| JP | 11-203501 | 7/1999 |

* cited by examiner

*Primary Examiner*—Kee M Tung
*Assistant Examiner*—Crystal Murdoch
(74) *Attorney, Agent, or Firm*—Wenderoth, Lind & Ponack, L.L.P.

(57) ABSTRACT

An image processing program creates a gradation of a sharp edge shadow and a gradation of subtle colors. The program causes a computer to perform a step in which a diffuse reflection from a first and second object and a shadow of the first object on the second object in a lighting information texture which are generated by a virtual light hitting the first and second object are superimposed onto a base texture which represents details of the object so that a target object is mapped; a step in which a mirror reflection which is generated by the virtual light hitting the first and second object is calculated so that a specular reflection is generated to surfaces of the first and second object; and a step in which the specular reflection is masked based on mask information provided in the lighting information texture which is mapped to the second object.

6 Claims, 5 Drawing Sheets

APPARATUS AND PROGRAM FOR IMAGE GENERATION

BACKGROUND OF THE INVENTION

1. Field of the Invention

The present invention pertains to a technology of rendering in a Computer Graphics (CG) technology. In particular, the present invention pertains to an image generation apparatus and program for more realistically displaying reflected light and a shadow on an object surface caused by light from an optical source.

2. Description of the Related Art

In various simulation machines and game machines that use the CG technology, generating more realistic images in real time is required. In such machines, more naturalistic images are displayed by executing processing (so-called rendering) for generating a 2D image from information upon an object modeled in a three-dimensional space, light (virtual optical source), a camera (virtual camera) and the like.

In order to provide a more realistic image, it is necessary to reflect effects from the optical source to the image. The kinds of optical source include: an optical source having very high intensity such as the sun; an optical source having high intensity and having directivity in a certain direction such as a laser beam and spotlight; an optical source having low intensity, having directivity and being reflected by a mirror surface such as the starlight. The reflection on the object surface that occurs when light from such an optical source is applied to the object can be classified into a diffuse reflection and a specular reflection. The reflected light by the diffuse reflection is light that reflects equally in all directions of the object. The reflected light by the specular reflection is light having the directivity. Specifically, it is light which reflects with directivity in the direction of the angle of reflection that is equal to the angle of incidence. The latter diffuse reflection light includes: diffused light which is represented by direct lighting from the sun such as under the sun of daytime; and surrounding light or ambient light which is represented by the light reflected from a surrounding object. In general, since ambient light is produced from innumerable optical sources, in image processing using a computer, ambient light is processed as a constant term of diffused light.

On the other hand, when light (reflected light etc.) and shadows on an object surface are created, it is necessary to consider the followings:

(1) Color and design of a base on an object surface;
(2) Diffuse reflection on the object surface;
(3) Shadow that is produced when light is blocked;
(4) Specular reflection on object surface; and
(5) Background reflections of the environmental surroundings.

In addition, there are a shadow on side where light is not hit like the other side of object and a shadow (self shadow) cast on oneself by projection etc. of object, as a kind of the shadow of the above-mentioned (3), besides a shadow of oneself who drops to other objects.

As the method of creating the light and shadow in consideration of the element like the above-mentioned, for example, there are following methods:

(A) Method for creating luminance etc. of each pixel on polygon side on the basis of vertex data of polygon (data of color, luminance, and transparency etc. of vertex); and (B) Method for creating it by pasting texture that reflects shadow etc. beforehand on polygon.

As the method of the above-mentioned (A), for example, there are a gouraud shading method and a phone shading method. The gouraud shading method is a method of obtaining for a luminance of an edge by interpolation of the luminance between vertexes by using the vertex data of the polygon, and then drawing in the region of the polygon by interpolation of the luminance between the edge and the edge. The phone shading method is a method of the interpolation of not the luminance but the normal and drawing in the area of the polygon for the luminance of each pixel. As for the phone shading law of the latter, a huge arithmetic processing is needed. Therefore, the gouraud shading law of the former is generally used in the game machine etc. that processing by the real time is required.

On the other hand, as the method of the above-mentioned (B), about each pixel composing the texture, for example, the method of giving information on the color, the luminance, and the transparency beforehand, replacing the pixel in the part where the texture is pasted with the color, the luminance, and the transparency of the texture, or blending respectively the color, the luminance, and the transparency of the polygon is used. In that case, for example, when the texture of opacity or the translucent is pasted a part of the polygon, the polygon is displayed in the way on a display though had the same outline as the shape of the pasted texture. According to like this, as for the method that combines respects of the multitude and creates all of the convexo-concave, when a tabular object with the complex outline with the convexo-concave is displayed, the method that puts the texture with the outline of the object requested to one polygon is adopted.

Here, a concrete example will be shown and described about the processing of rendering by using a prior art.

FIG. 1A to FIG. 1E are schematic diagrams showing an example of a flow of the rendering processing by using the prior art. In order to facilitate understanding here, as shown in FIG. 1A, the case where a polygon model A (the first object) composed by globe A1 and cube A2 is provided on a polygon model B (the second object) of the 2D shape, and light (parallel light of plane shape in this example) is applied from a virtual optical source located above each model will be described as an example.

Base texture T1 shown in FIG. 1B is a texture that represents the color and the design etc. of the base on the object surface. In the process of rendering, a required portion is cut out from the base texture T1 firstly, and the cut required portion is pasted to the first object A and the second object B shown in FIG. 1A. As shown in FIG. 1C, the color and the design on the surface of object B, and the design etc. of object B that reflects on the surface of object A are created by this processing.

On the other hand, the reflected light and the shadow on the object surface are calculated about the color information of each vertex of the polygon (concentration of three primary colors of red (R), green (G), blue (B)) beforehand on the basis of information on the ray vector and the normal vector, etc. And then, it is set as vertex data of the polygon with other attribute information (vertex coordinates, transparency, texture coordinates, and normal vector, etc.). Furthermore, color information on the polygon side is calculated by using the vertex data of the polygon by the interpolation processing of the segment interpolation etc. by using the gouraud shading method, and then the image information of object A and B shown in FIG. 1D is memorized. In addition, the area of the reflected light might change depending on the direction of the gaze, and the shape of the shadow change by moving the optical source. When the state is created, it is necessary to operate the color information of the polygon of the correspondence by the above-mentioned gouraud shading method etc. in consideration of each position of optical source, the object A, and the object B, and to generate the image information for the lighting effect to the real time, in the process of rendering.

Next, the image information of FIG. 1C and the image information in FIG. 1D are multiplied (it is a synthesis as for color information). As shown in FIG. 1E, image that reflects the reflection of light (diffuse and specular) and shadows on the object A and the object B on the surface is created by this processing. Conventionally, for example, the dynamic image of the object A that moves in the three-dimensional space is displayed by repeat the processing of such rendering by the unit of the frame.

In addition, according to the gouraud shading method, the case where no location of each vertex in the irradiation area when light with a small irradiation area in which the spotlight is applied or only a part of vertex is located is occurred. Therefore, there is a problem that the distribution of realistic light cannot be reproduced. For such the problem, for example, an invention to be able to display the effect by the optical source more realistically by detects the polygon located in the discipline of the light of the diffuse reflection light and the specular reflection light and shadows, generating the polygon that is divided and is subdivided, using the vertex data of the polygon, and processing it by the gouraud shading method etc. is disclosed in Japanese Patent Application Laid Open (Kokai) No. 11-203501.

Moreover, for example, it changes by generally reading a separate texture that has the desired design in every case to change the shape of the design drawn in the texture (outline) like creating the appearance for the moon displayed in the background to wane. However, there is a problem such as needing a mass texture map in this method. For such the problem, for example, an invention that enables the shape of the design to be changed by using the same texture by amending alpha value (for example, by amending alpha value of the correspondence in the part to opacity or transparent) that shows the transparency from which the texture is provided for each pixel is disclosed in Japanese Patent Publication No. 3380674.

SUMMARY OF THE INVENTION

By the way, lighting information on the reflected light and the shadow, etc. can be created in a method of rendering conventionally at the time of used the above mentioned gouraud shading method by only the vertex unit of the polygon. Therefore, since the image with a dopy reflected light and shadow is generated like the example of FIG. 1E, the gradation of a sharp edge shadow and a delicate color etc. could not be created. Moreover, there has been a problem that a huge arithmetic processing is needed to have to increase the number of polygons of the model to create it in realism or more, and the apparatus that has been able to be applied was limited. For example, it is possible to improve by dividing the polygon, subdividing only the part of the correspondence like the above mentioned Japanese Patent Application Laid Open (Kokai) No. 11-203501 by processing it using the vertex data of the polygon. However, it has been difficult to create a sharp edge shadow etc. Moreover, the effect by lighting from the optical source has been desired to be improved more by fewer throughputs.

In addition, according to a method of the image generation conventionally at the time of being described by using FIG. 1, brightness in the part where light has been applied could not be lightened from the texture of the base only to multiply by the color information of the vertex. Therefore, there has been a problem such as being not able to create strong light when it turned a spotlight on to the surface of the object and the light of the strong sun fine etc. is hit. For example, strong light can be created to such a problem by processing the image based lighting with High Dynamic Range (HDR) information. However, there has been a problem that light got on a dark part of the shadow etc. as it is, and even an originally dark part lightened.

The present invention has been achieved considering the problems like the above-mentioned. Therefore, an object of the present invention is to provide an image generating apparatus and an image processing program which can create a sharp edge shadow and a gradation of subtle colors, by solving the above problems.

The present invention relates to an image generating apparatus and an image generating program, and the above-mentioned object of the present invention is achieved by an image generating apparatus for generating an image by disposing objects composed of polygons, a virtual camera, and a virtual light source disposed in a virtual three dimensional space and picking up an image by the virtual camera, comprising: two dimensional image storing means for storing a lighting information texture which has a base texture for mapping a detail of each object disposed in the virtual three dimensional space, color information for at least mapping a diffuse reflection from a surface of the object and a shadow of the object, and mask information for masking a dark region including the shadow; texture mapping means for mapping a diffuse reflection from a first object and a second object and a shadow of the first object on the second object, which are generated by a virtual light from the virtual light source hitting the first object and the second object, to a target object by superimposing the diffuse reflection and the shadow on the base texture based on the lighting information texture; specular reflection generating means for generating a specular reflection to surfaces of the first object and the second object by calculating a mirror reflection of the first and second object which is generated by the virtual light; and light masking means for masking the specular reflection based on the mask information provided in the lighting information texture which is mapped to the second object.

Moreover, the above object of the present invention is achieved more effectively in each of the following conditions: the specular reflection generating means determines whether a portion in the lighting information texture which corresponds to a portion to which a specular reflection is generated is provided with the mask information or not, and does not perform a processing for generating the specular reflection to a portion which has the mask information; the mask information is black and white information converted from color information; and the objects composed of polygons are discernibly set to be a movable object which moves in the virtual three dimensional space or a fixed object which is fixed in the virtual three dimensional space or is in a constant position relationship with the virtual light source, and the image generating apparatus further comprises determining means for determining whether a target object to be processed is the fixed object or not, and only when the determining means determines that the target object is the fixed object, a mapping process for the diffuse reflection and the shadow is performed by using the lighting information texture.

In addition, the above object of the present invention is achieved by an image processing program for enabling a computer to execute an image generating processing in which a virtual light source, objects composed of polygons, and a virtual camera are disposed in a virtual three dimensional space, and the virtual camera picks up an image to be generated; comprising: a mapping step in which a diffuse reflection from a first object and a second object and a shadow of the first object on the second object in a lighting information texture which are generated by a virtual light from the virtual light source hitting the first object and the second object are superimposed onto a base texture which represents details of the object so that a target object is mapped; a specular reflection generating step in which a mirror reflection which is generated by the virtual light hitting the first object and the second object is calculated so that a specular reflection is generated to surfaces of the first and second object; and a masking step in which the specular reflection is masked based on mask information provided in the lighting information texture which is mapped to the second object.

Moreover, the above object of the present invention is achieved more effectively in each of the following conditions: when the specular reflection is generated, whether a portion in the lighting information texture which corresponds to a portion to which the specular reflection is generated is provided with the mask information or not is determined, and if the portion is provided with the mask information, the processing for generating the specular reflection to the portion is not performed; when the specular reflection is generated, the specular reflection is generated by a processing using image based lighting with high dynamic range information; and each of the objects composed of polygons are discernibly set to be a movable object which moves in the virtual three dimensional space or a fixed object which is fixed in the virtual three dimensional space or is in a constant position relationship with the virtual light source, and the image generating program further comprises a determining step for determining whether a target object to be processed is the fixed object or not, and only when it is determines that the object is the fixed object in the determining step, the mapping process for the diffuse reflection and the shadow is performed by using the lighting information texture.

According to the present invention, since the diffuse reflection such as a shadow and lighting information for representing a shadow and the like are stored in advance in a second texture (lighting information texture) not on a vertex of a polygon, a sharp edge shadow and a gradation of subtle colors can be created without any interpolation between vertices. Also, since a dark region such as a shadow is masked when a specular reflection is generated, a specular reflection can be added without any damage to the dark region such as a shadow. This mask processing allows an intense sunlight in a clear sky to be realistically created. In addition, since a lighting calculation for a light from a light source needs a specular reflection element, a process amount is reduced and the specular reflection is displayed at an accurate position. The lighting can be achieved by a more simple calculation than a typical lighting calculation and can be realistically created by using image based lighting with HDR (High Dynamic Range) information.

DETAILED DESCRIPTION OF THE INVENTION

Figure 1:
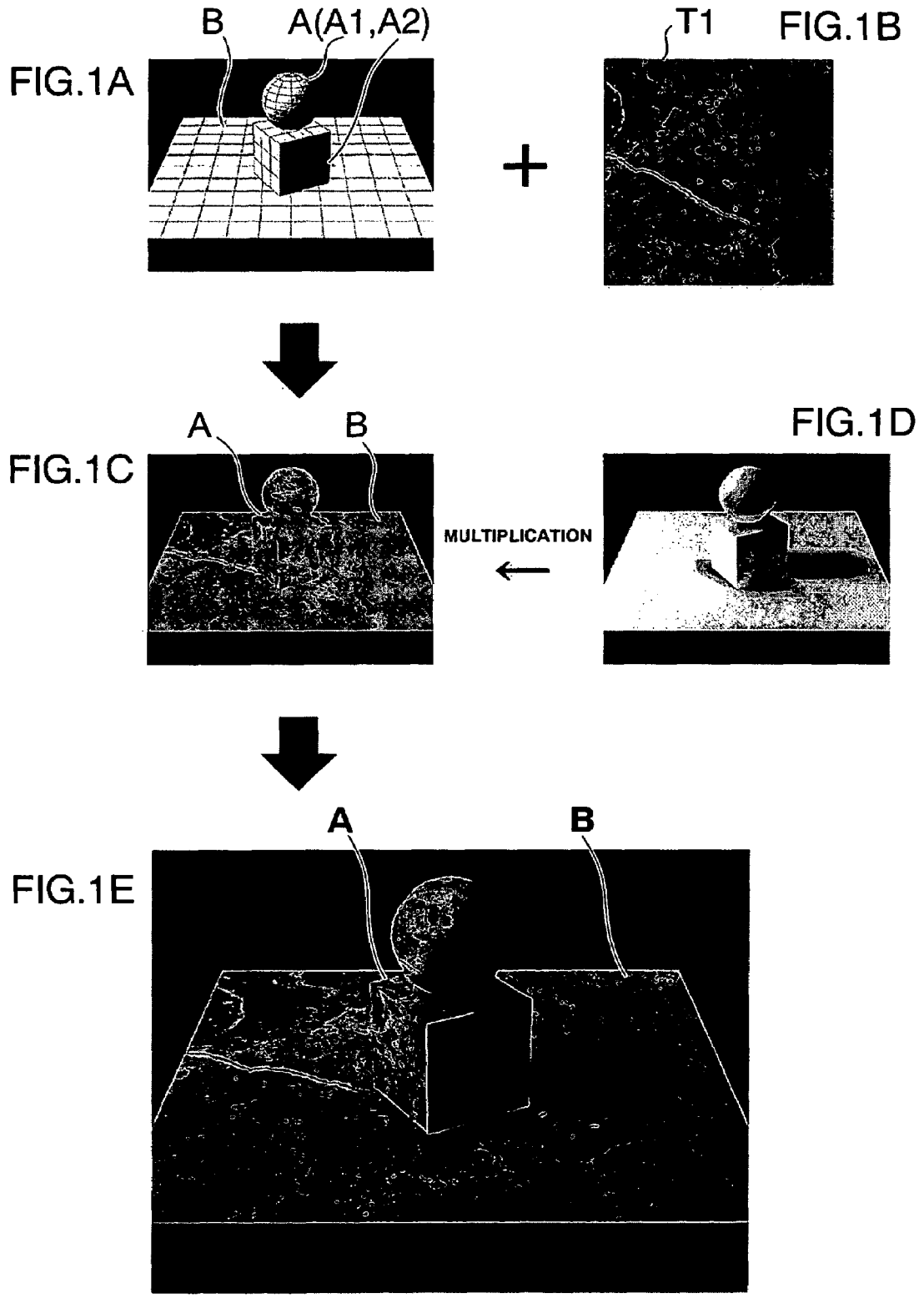
FIGS. 1A to 1E are schematic diagrams showing an example of a flow of a rendering processing according to the prior art.

The present invention is suitably applied to an information processor that the generation processing of animation by the real times is required such as the game machine and simulation equipment. First of all, an outline of a technical idea of the present invention and technical features of the present invention in the processing at rendering will be explained.

Since processing of shading of diffuse reflection etc. on light on an object surface and Shadowing processing of shadow that reflects in other objects depend on the position of the optical source and the object and the angle of incidence of the light, only the aspect position changes, the position of the luminance and the shadow of the object does not change. On the other hand, since the specular processing of the specular reflection etc. of light on the object surface changed to strength of the reflected light by the eye's direction, it has features of receiving the influence of the aspect position easily.

Moreover, the above-mentioned shading and shadowing interpolate and obtain the luminance between vertexes of the polygon composed the object etc. by the calculation. Therefore, the boundary of the light and shadow might be not correctly created according to the number, the size, and the shape of the polygon.

Then, processing is executed about the shading processing and the shadowing processing in the present invention by the method of not obtaining the surface trait by the calculation but the cutout of the required portion from the texture for lighting and pasting to the object. On the other hand, the specular processing is displayed at a correct position by obtaining the surface trait by the calculation.

When the specular is displayed in two or more objects by such processing, the shadow of other objects might reflect in the position where a certain object is displayed the specular. Since light is actually shut out as for the part of the shadow that hits the object, a correct specular cannot be displayed only by the position of the object and the optical source. Therefore, it is necessary to process the specular that considers the position with other objects in earlier methods. When animation is generated to the real time with CG, it is necessary to execute correct processing within a limited amount of time. However, since it takes time for the processing in earlier methods to compare the position of the shadow and the position of the specular, and the real-time processing cannot be achieved with the apparatus of the low capacity, the range is limited.

Then, mask information is built in the texture for lighting beforehand in the present invention. Thereafter, for example, when the specular is displayed, it is determined whether or not there is the mask information in the texture for lighting at the position in portion. If there is the mask information in the texture for lighting at the position in portion, processing is skipped so as not to display the specular to the part. Moreover, when the mask information is composed in a multi bit, the density (luminance) of the specular is changed depending on sizing of the value. Thus, it is possible to a correct display reducing throughput.

In addition, when the position of the virtual optical source and the object is constant (or fixed), this image processing produces a further effect.

In this case, when the position of the virtual optical source and the object is constant (or fixed), the diffused light is always similarly irradiated to the same position of the object. Therefore, since the reading address from the texture memory of the lighting information texture reaches the same value, the luminance meter calculation of the polygon vertex and the calculation of the texture address are unnecessary.

Therefore, according to the present invention, the object that moves or changes the direction in virtual 3 dimensional spaces and the object allocated to fixation are stored in a memory with the flag etc. distinguishable. Thereafter, when drawing, it is decided whether or not the above-mentioned processing is executed and then draws by using this flag when identified to the object allocated fixedly in virtual 3 dimensional spaces.

Moreover, the flag may be set to the lighting information texture as a parameter, and the parameter of the texture used to draw about the object may be identified when drawing. Thereafter, it may be decided whether or not to execute the above-mentioned processing and then to draw by using the value of the parameter (flag).

The object allocated in the virtual 3 dimensional space fixedly is, for example, building and scenery, etc. and the object that moves or changes the direction is person, animal, and vehicles, etc.

In general, since the object allocated fixedly in virtual 3 dimensional spaces is a still image when the aspect position and the direction are fixed, the precision of the detail on the surface and the hit condition of light is required. On the other hand, the same part is never displayed at the same position as for the object that moves or changes the direction since the position and the direction are always changed and are displayed as the aspect position and the direction regardless. Therefore, the precision of the detail on the surface and the hit condition of light is not required of the object allocated fixedly. Thus, the present invention is effective in the image representation in video game etc. that generate a real-time dynamic image.

Various embodiments of the present invention will be described herein below with reference to the accompanying drawings. It is to be noted that the same or similar reference numerals are applied to the same or similar parts and elements throughout the diagrams, and the description of the same or similar parts and elements will be omitted or simplified.

FIGS. 2A to 2G are schematic diagrams for explaining an example of rendering processing's flow according to the present invention compared with the conventional example shown in FIG. 1. In addition, in order to facilitate understanding here, as shown in FIG. 2A, the case where a polygon model A (the first object) of the 3D shape is provided on a polygon model B (the second object) of the 2D shape, and parallel light of plane shape (virtual light) is applied from a virtual optical source located above each model will be described as an example, as well as FIG. 1A. However, the present invention is not limited to the shape of object A and B, kinds of the optical source (point light source, spotlight, parallel light source, line light source, and surface light source, etc.), and the number of the object and optical sources. Moreover, although the explanation is omitted about the processing of the shadow (self shadow) etc. that the first object A casts on itself, each part to which the object is composed only replaces the first object and the second object, a processing according to rendering is similar.

Although the processing at rendering of according to the present invention will be described along the flow of FIG. 2A to FIG. 2G as follows, the processing of following (a) to (d) does not define the processing order.

(a) "Mapping Processing of Base Texture"

Base texture T1 shown in FIG. 2B is a texture that represents the color and the design etc. of the base on the object surface. In the process of rendering, a required portion is cut out from the base texture T1 firstly, and the cut required portion is pasted to the first object A and the second object B shown in FIG. 2A. This processing is similar to the conventional example, the color and the design on the surface of object B, and the design etc. of object B that reflects on the surface of object A are created as shown in FIG. 2C.

(b) "Mapping Process of Texture for Lighting"

On the other hand, when the reflected light and the shadow on the object surface are created, the image information for the lighting effect is not given the color information of the shadow etc. to the vertex data of the polygon conventionally but is given to texture T2 (hereafter, it is called, "lighting information texture") for lighting of the second piece as shown in FIG. 2D.

The lighting information texture T2 according to this embodiment has mask information described later besides color information (three primary colors of R, G, and B concentration information) that at least creates the shadow, the diffuse, and the ambient (the reflected light from the object and wraparound of light caused by the atmosphere etc.) that occurs because of the virtual light from the virtual optical source. "Shadow" mentioned here are the shadow on the side where the light of the object is not hit, the shadow of oneself who casts to other objects, and a shadow that the object cast on oneself etc. In the present invention, the color information that creates all these shadows is provided for lighting information texture T2. In addition, it may use information to take picture of the actual model with the camera etc. for this lighting information texture T2.

When the lighting effect of light from the optical source is created by using such the lighting information texture T2, a required portion is cut out from the lighting information texture T2 shown in FIG. 2D, and the color information in the part and the image information shown in FIG. 2C are multiplied (synthesis).

In a word, the diffuse reflection when the virtual light from the virtual optical source is applied to the first object A and the second object B and the lighting information texture T2 that represents the shadow of the first object A applied to the second object B is superimposed to the base texture T1 that shows the detail of the object, and maps to the first object A and the second object B, in the processing of the above-mentioned (a) and (b). According to such the processing, it is possible to create the shadow, the diffuse, and the ambient, etc. that occur when the light is applied to each object A and B, and to create the gradation of a clear shading and a delicate color etc., as shown in FIG. 2E.

(c) "Generation Processing of Specular"

Next, the creation of the specular will be described.

As mentioned above, the specular reflection on the object surface does not proliferate light, and means the reflection like the mirror that reflects at same angle to the object as the angle of incidence. When the light of strength Ip enters from a certain optical source, the luminance Ls observed by the specular reflection is created by the following equations:

$$Ls = c(s) \cdot \cos e^\wedge n \cdot Ip,$$

where e is the angle of the line of sight and the reflected light. Therefore, the luminance is decided according to the gap angle of the eye's direction and the specular direction. That is, it is easy to receive the influence of the aspect position since strength of the reflected light changes by the eye's direction. Therefore, according to this embodiment, the surface trait is requested by the calculation about the specular in order to display a correct specular even if the position and the area of the specular reflection change by the variation such as eye's directions.

As the generation processing of the specular, for example, the specular reflection when the virtual light hits each object A and B is calculated, and the specular is generated to the surface of each object A and B (the polygon part where the influence of the specular reflection is received). In this embodiment, the image that reflects the specular is generated by executing the image based lighting with High Dynamic Range (HDR) information. In addition, the method of generating (forming) the specular to the object surface includes the method of a technology that is well-known etc. as follows:

(1) Method of pasting the texture of specular to the polygon of the object by using the polygon of specular;

(2) Method of changing the vertex color of polygon of the object and processing shading by using the polygon of specular;

(3) The method of amendment of the texture of the polygon to which the object is composed to the texture of the specular, or the method of superimposing and pasting the texture of the specular to the texture of the polygon to which the object is composed;

(4) Method of changing the portion color of the polygon to which the object is composed and processing shading. It may use either of the above-mentioned methods.

(d) "Masking Processing of Light (Specular Light)"

If the specular processing like the above-mentioned is executed as that is, a dark part of the shadow etc. lightens since the specular light is synthesized to the dark part of the shadow etc. Mask information (Hereafter, it is called, "light mask information") is provided in the lighting information texture T2 in order to evade this and to reduce throughput in the rendering, according to the embodiment of the present invention. And then, when the specular is displayed on the object surface, the specular is displayed for non-mask area of the display areas. That is, the dark part of the shadow etc. prevents an originally dark part from lightening by covering with the envelope (by masking) and then generating the specular.

The light mask information used for the present invention is information to maintain (or amend) a dark part of the shadow etc. in original darkness as the mentioned above. It is composed as a data organization of the light mask information by the mask value of every the pixel to which the lighting information texture T2 is composed. And, the mask value is composed by binary information (black and white) that shows whether to mask the pixel at the position or multivalued information (step value of luminance or concentration) that shows gray scale. Although the storage location of this light mask information is not limited, an unused area (it is a storage area of the information (alpha value) that shows the transparency in this example) of each texel of the texture is preferably used in the lighting information texture T2. For example, when the processing of texture mapping is composed of the circuit, the area of the alpha channel is used.

FIG. 2F shows the image of mask information. In this embodiment, the color information of the shadow etc. set to the lighting information texture T2 shown in FIG. 2D is converted to black and white information (black and white image made binary or image of a multiple tone of the gray scale), and then the black and white information is assumed to be "mask information".

When the specular is generated to the surface of object A and B by using such mask information, for example, it is determined whether or not there is the mask information in the part (area or position) of lighting information texture T2 corresponding to the part (area or position) where the specular is generated. If there is the mask information, the generation processing of the specular (drawing process) is preferably skipped so as not to display the specular to the part.

In addition, either of the following methods is acceptable as the drawing order, as following:

a method for calculating the specular reflection from the optical source etc. after the base texture and the lighting information texture of the object is mapped to the objects A and B, and drawing of the specular by pixel unit on the basis of the mask information set to the lighting information texture; and a method for drawing the specular by calculating the specular reflection to the objects A and B from the optical source etc. for the object, and drawing the base texture and the lighting information texture by pixel unit on the basis of mask information set to the lighting information texture when the base texture and the lighting information texture are afterward mapped. In the latter case, the base texture is mapped to the objects A and B beforehand, and then it may lie on one's back only of the lighting information texture by pixel unit on the basis of mask information set to this.

Figure 2:
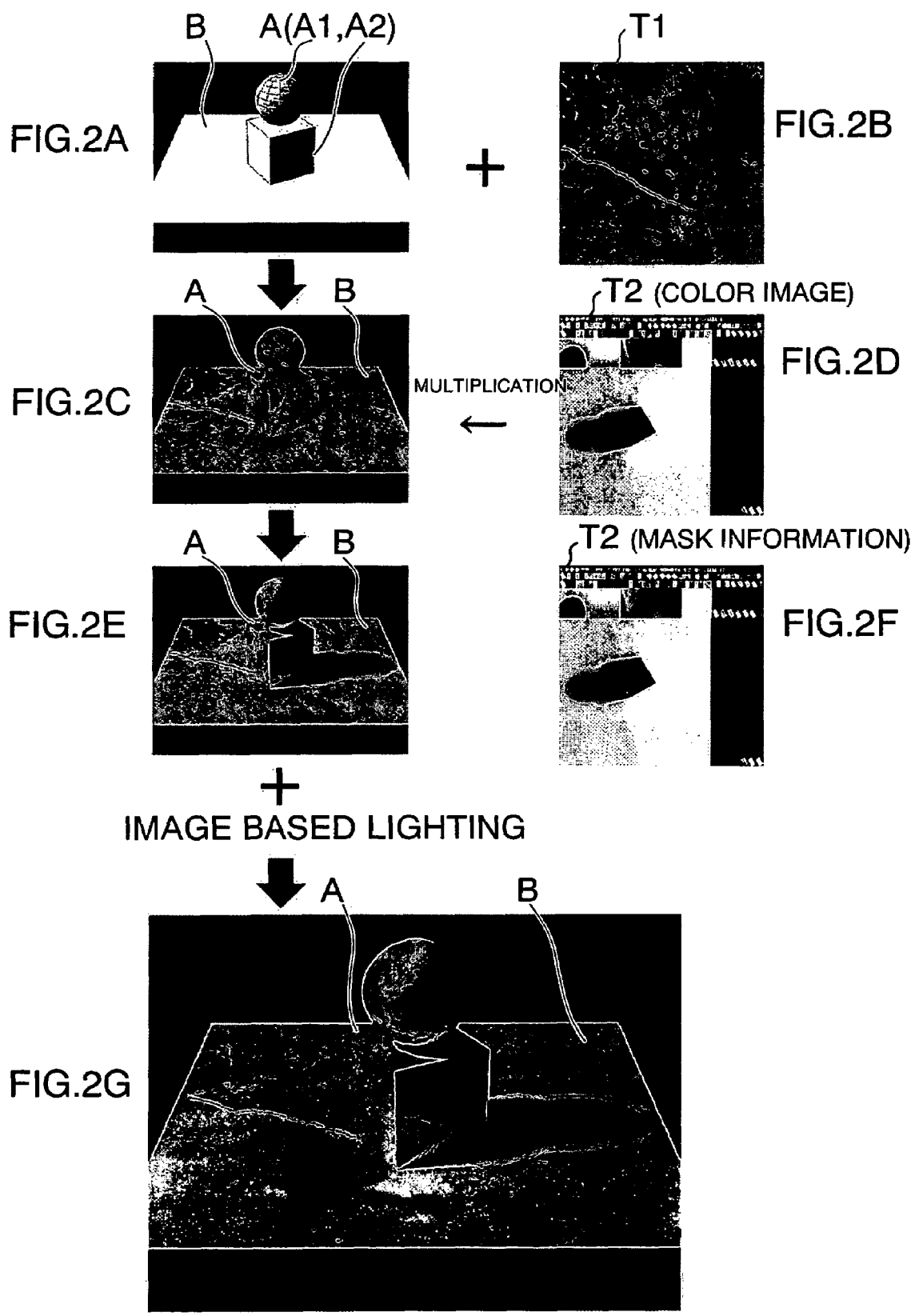
FIGS. 2A to 2G are schematic diagrams showing an example of a flow of a rendering processing according to the present invention.

In the example shown in FIG. 2, when the specular is generated to the surface of the objects A and B shown in FIG. 2E, it is assumed the state to mask the specular on the basis of the mask information. And then, it is possible to display correctly reducing throughput by generating for non-mask area of the areas where the specular is generated. For example, when the state is created fine weather etc. and strongly the application of the sun of light (or when the state is created to be turned a spotlight on to the surface of the object), strong light as shown in FIG. 2F can be created and it can be displayed that a dark part of the shadow etc. did not lighten.

In addition, when the step value in which the gray scale is indicated is assumed to be the mask value, for example, the image of the specular is generated mixing the concentration (luminance) included in the mask information and the generation information on the specular. That is, it may as the composition in which the density of the specular (luminance) is changed depending on sizing of the mask value to which the setting or the setting is changed beforehand.

A program (Hereafter, it is called, "image processing program") to make a computer execute the image generation processing including the processing of the above-mentioned rendering is stored in an arbitrary apparatus external record medium or a recording medium in the apparatus, and is read by the computer of the apparatus and then executed. The image processing program according to the embodiment of the present invention is provided by being installed in a program that is instructed from the main program that executes other processing and operates, various application programs, or a game program or a simulation program, etc., and then the computer is operated as various information processors. In addition, the mode where a part of processing of image generation processing according to the embodiment of the present invention is achieved with hardware is included in the present invention.

Composition of Image Generation Apparatus

Next, the composition of an image generation apparatus that applies the algorithm of rendering according to the embodiment of the present invention will be explained.

Figure 3:
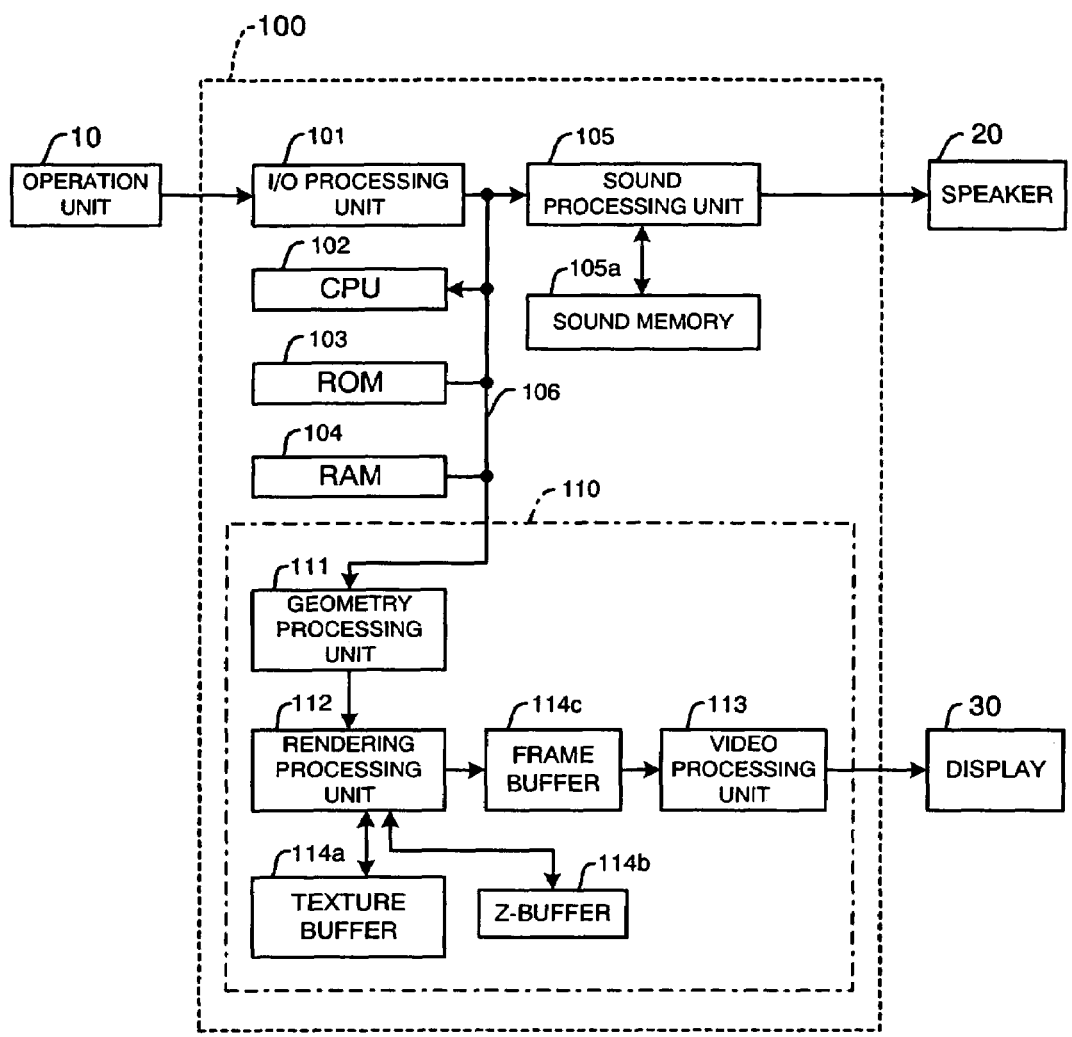
FIG. 3 is a block diagram showing an example of the structure of an image generation apparatus according to the present invention.

FIG. 3 is block diagram showing an example of the composition of the image generation apparatus according to the present invention. In addition, the present invention is not limited to simulation equipment or the game machine, and can be applied to various information processors such as a navigation apparatus, a medical treatment ancillary equipment, and a pachinko machine. Furthermore, the present invention is not limited to the hardware configuration shown in FIG. 3, and can be applied to the apparatus of general hardware configuration.

Since the technology according to the embodiment of the present invention is applied to a rendering processing unit 112 in FIG. 3, an image processing unit 110 or the rendering processing unit 112 can be defined as the image generation apparatus of the present invention. However, the part in the dotted line frame shown by reference symbol 100 in FIG. 3 is defined as the image generation apparatus and it will be explained here.

An operation unit 10 that an operator inputs, a speaker 20, and a display 30 etc. are connected with an image generation apparatus 100 in FIG. 3.

As for image generation apparatus 100, an input/output (I/O) process unit 101, a Central Processing Unit (CPU) 102, a Read Only Memory (ROM) 103, a Random Access Memory (RAM) 104, sound processing unit 105 having a sound memory 105a and an image processing unit 110 are connected respectively with a common bus 106.

As shown in FIG. 3, the image processing unit 110 includes a geometry processing unit 111, a rendering processing unit 112, a video processing unit 113, and a storing init (in this example, a texture buffer 114a, a Z-Buffer 114b, and a frame buffer 114c).

Geometry processing unit 111 executes the similarity transformation processing and the transparent transformation processing, etc. The similarity transformation processing rotates, reduces or expanses of the polygon of the object placed in the three dimensions coordinate system. The transparent transformation processing converts the aspect into 2-D coordinate system on display screen. The polygon data converted into the 2-D coordinate system is supplied to the rendering processing unit 112. The polygon data is usually composed by the three-dimensional coordinate of the vertex where the polygon is composed, the normal vector, the luminance data, the color data, the transparency, and vertex data of the texture coordinates (vertex data in 2-D coordinates), etc.

A texture buffer 114a where texture data is stored and a Z-Buffer 114b where Z value in which depth in two-dimension coordinates of each pixel is indicated is stored are connected with the rendering processing unit 112 in this embodiment.

The image information for one frame generated by the rendering processing unit 112 is written in the frame buffer 114c. And then, the image information written in frame buffer 114c is converted into the video signal according to predefined synchronous timing in the video processing unit 113, and output to display 30.

Processing to the polygon in the above-mentioned geometry processing unit 111 and the above-mentioned rendering processing unit 112 execute pipelining of the sequential processing for the polygon data supplied one after another in usual image generation apparatus. Or, the geometry processing and the rendering processing are executed according to each processing program when processing by the general computer.

Figure 4:
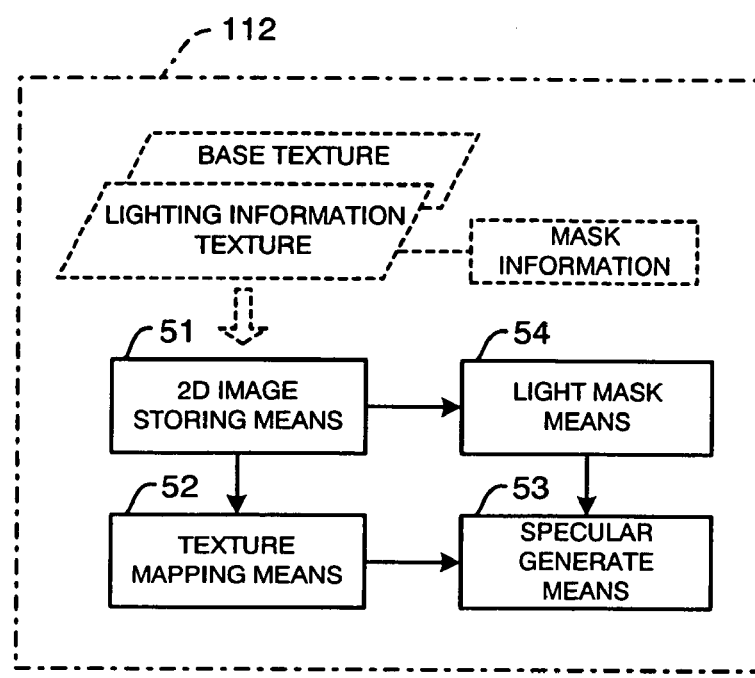
FIG. 4 is a functional block diagram showing an example of the structure of a rendering processing unit according to the present invention.

FIG. 4 is a functional block diagram showing the composition of principal part of the rendering processing unit 112 according to the embodiment of the present invention. The rendering processing unit 112 includes a 2D image storing section 51 that stores the above-mentioned base texture and lighting information texture, etc., a texture mapping section 52 that executes the mapping processing of above-mentioned (a) and (b), a specular generate section 53 that executes the generation processing of specular of above-mentioned (c), and a light mask section 54 that executes the mask processing of light of above-mentioned (d).

The 2D image storing section 51 shown in FIG. 4 corresponds to the texture buffer 114a shown in FIG. 3 as hardware. The texture mapping section 52 includes a function that the diffuse reflection when virtual light from virtual optical source hits the first object and the second object and the shadow of the first object that hits the second object are superimposed to the base texture where detail of object is shown by the lighting information texture and then it maps to the object.

The specular generate section 53 includes a function that calculates the specular reflection when the virtual light hits the first object and second object, and generates the specular on the surface of the first object and second object. And, the light mask section 54 includes a function that masks the above-mentioned specular on the basis of the mask information provided in the lighting information texture mapped to the second object.

The above-mentioned each section 51 to 54 functionally classified naming the section name to the component in order to indicate the functional composition of the rendering processing unit 112 for convenience' sake of the explanation, and doesn't limit the software composition etc. Moreover, in this embodiment, although the texture mapping section 52, the specular generate section 53 and the light mask section 54 mentioned above are achieved by the image processing program in cooperation with the hardware, it may compose a part of the processing or all of the processing with hardware.

Operation of Image Generation Apparatus

In such the composition, an example of the operation of image generation apparatus according to the embodiment of the present invention will be explained. In addition, the explanation will be omitted about operations of each unit other than the rendering processing unit 112 since it is similar to the operation of general image generation apparatus, and the main operation of the rendering processing unit 112 according to the embodiment of the present invention will be explained hereafter.

Figure 5:
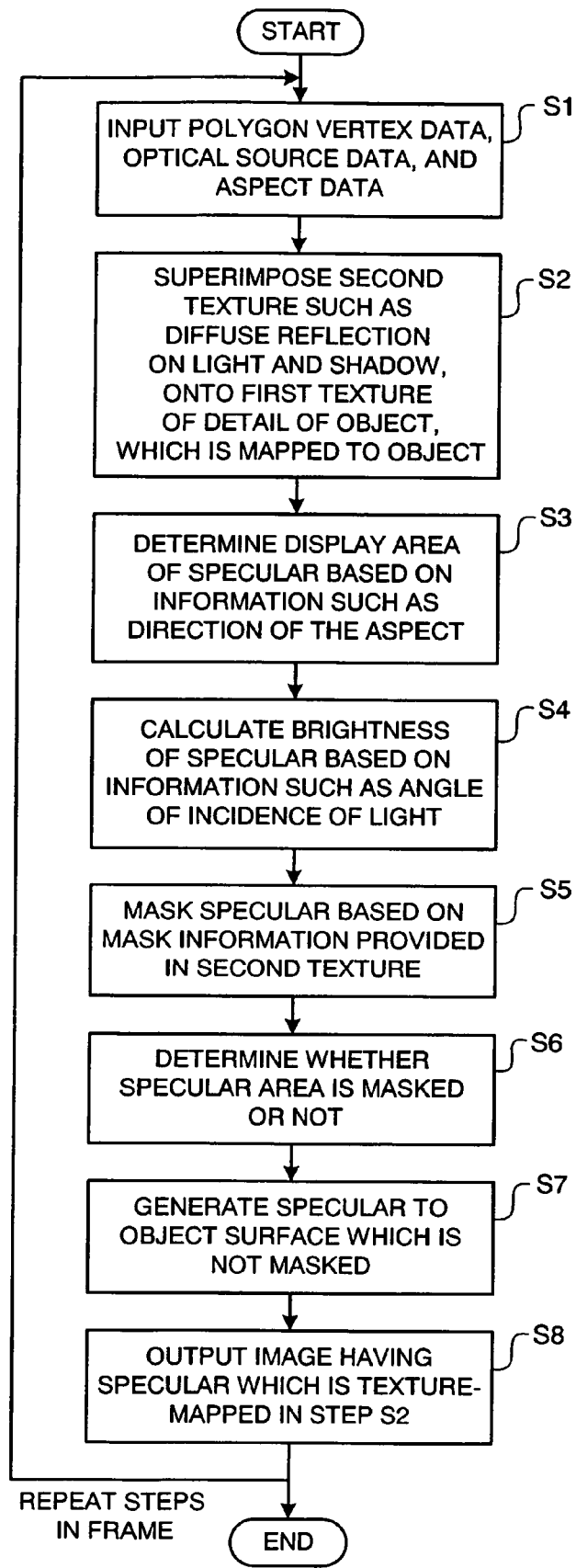
FIG. 5 is a flow chart for illustrating an operation of the rendering processing unit according to the present invention, by way of example.

The example of operating of the rendering processing unit 112 according to the embodiment of the present invention will be explained along the flow of the flow chart shown in FIG. 5 as follows.

The rendering processing unit 112 inputs the vertex data, the optical source data and the aspect data of the polygon of each object supplied from the geometry processing unit 111. In the case of the spotlight, for example, the optical source data inputted here includes information in the position coordinate of the optical source, strength, the color, the range of distance where the optical beam from the optical source reaches, the cone-angle where the extension of light are indicated, and the direction, etc. (step S1).

The texture mapping section 52 of the rendering processing unit 112 reads a base texture (texture of the first piece)

corresponding to the texture coordinates of the polygon and a lighting information texture (texture of the second piece) from the 2D image storing section 51 (the texture buffer 114*a* shown in FIG. 3), superimposes the diffuse reflection when light from the optical source hits the first object and the second object and the shadow that the first object (object on the optical source side) casts on the second object (object on the back side against the optical source) to the base texture where the detail of the object is shown by a lighting information texture, and maps it to the first object and the second object (step S2). In addition, "lighting information texture" mentioned here is the texture T2 for lighting of the second piece that has the color information and mask information mentioned above, and one texture that shows the shadow, the diffuse, and the ambient, etc.

Continuously, the specular generate section 53 of the rendering processing unit 112 determines the area of the specular in the object surface when light from the virtual optical source hits the object by obtaining the position etc. of each object, the aspect, and the optical source based on the vertex data, the optical source data, and the aspect data of each object (Step S3). At the same time, the specular generate section 53 calculates the brightness of the specular (concentration the luminance or the color, or both) on the object surface on the basis of information of the strength and the color of the optical source, and the angle of incidence of light etc. (Step S4).

On the other hand, the specular area (display area of the specular light) is masked by the light mask section 54 on the basis of the mask information provided for the lighting information texture mapped to the second object (object on the back side where light from the optical source is shut out by the first object) (Step S5). And then, when the specular generates the image information in said Step S4 (or when the image information of the specular is synthesized as the image information that executes texture mapping in said Step S2 and displays it), the specular generate section 53 determines whether or not there is the mask information (mask value) in each pixel position of the specular area (Step S6). If there is the mask information, the specular generate section 53 generates (or synthesizes) the specular only to the part of the correspondence by processing the image based lighting with High Dynamic Range (HDR) information for non-mask area skipping the processing of the specular (Step S7). And then, the image information that reflects the specular is written to the frame buffer 114*c* (Step S8), and the processing for one frame is completed.

The image that reflects the effect of various lights and shadows on the object surface by lighting from the optical source is output to the display 30 by the above-mentioned processing. And then, the dynamic image is displayed by repeating the processing of each frame since step S1. For example, in the case of the game machine, the dynamic image of the mobile object (player character etc.) that responds to the manipulation of the operation unit and moves in a virtual three-dimensional space is displayed. Moreover, in the case of the navigation apparatus, the dynamic image etc. that show the appearance to which the model by which the mobile object (vehicle or person who have the portable telephone etc.) is represented moves on the image in the map are displayed by inputting the position information of the mobile object received by the wireless as a variant.

As mentioned above, the color information of the shadow etc. by the lighting is given as a texture in the image generation apparatus (and program) according to the present invention. And then, the shadow, the diffuse, and the ambient, etc. are reflected by superimposing the texture with the base texture and mapping it to the object surface. On the other hand, about the specular, the position of the specular that changes along with the change in the eye's direction, the movement of the object, the optical source, and the virtual camera etc. is detected by the operation, and the specular is set to the right place, and a dark part of the shadow etc. is masked and the specular is displayed. As a result, the reflected light and shadow etc. of the object surface can be displayed further more realistically reducing throughput in rendering.

Although the embodiments of the present invention have been explained, the present invention may be embodied in other specific forms without departing from the spirit or essential characteristics thereof. A variety of alternative embodiments, implementation examples, and the operation techniques are clear for those skilled in the art from this disclosure.

The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An image generating apparatus for generating an image by disposing objects composed of polygons, a virtual camera, and a virtual light source disposed in a virtual three dimensional space and picking up an image by the virtual camera, comprising:

a two dimensional image storing means for storing a lighting information texture which has a base texture for mapping a detail of each object disposed in the virtual three dimensional space, color information for at least mapping a diffuse reflection from a surface of the object and a shadow of the object, and mask information for masking a dark region including the shadow;

a texture mapping means for mapping a diffuse reflection from a first object and a second object and a shadow of the first object on the second object, which are generated by a virtual light from the virtual light source hitting the first object and the second object, to a target object by superimposing the diffuse reflection and the shadow on the base texture based on the lighting information texture;

a specular reflection generating means for generating a specular reflection to surfaces of the first object and the second object by calculating a mirror reflection of the first and second object which is generated by the virtual light; and a light masking means for masking the specular reflection based on the mask information provided in the lighting information texture which is mapped to the second object, wherein the objects composed of polygons are discernibly set to be a movable object which moves in the virtual three dimensional space or a fixed object which is fixed in the virtual three dimensional space or is in a constant position relationship with the virtual light source, and the image generating apparatus further comprises determining means for determining whether a target object to be processed is the fixed object or not, and only when the determining means determines that the target object is the fixed object, a mapping process for the diffuse reflection and the shadow is performed by using the lighting information texture.

2. The image generating apparatus of claim 1, wherein said specular reflection generating means determines whether a portion in the lighting information texture which corresponds to a portion to which a specular reflection is generated is provided with the mask information or not, and does not perform a processing for generating the specular reflection to a portion which has the mask information.

3. The image generating apparatus of claim 1, wherein the mask information is black and white information converted from color information.

4. An image processing program stored on a computer-readable storage medium for enabling a computer to execute image generating processing steps in which a virtual light source, objects composed of polygons, and a virtual camera are disposed in a virtual three dimensional space, and the virtual camera picks up an image to be generated, the steps comprising:
- a mapping step in which a diffuse reflection from a first object and a second object and a shadow of the first object on the second object in a lighting information texture which are generated by a virtual light from the virtual light source hitting the first object and the second object are superimposed onto a base texture which represents details of the object so that a target object is mapped;
- a specular reflection generating step in which a mirror reflection which is generated by the virtual light hitting the first object and the second object is calculated so that a specular reflection is generated to surfaces of the first and second object; and
- a masking step in which the specular reflection is masked based on mask information provided in the lighting information texture which is mapped to the second object, wherein each of the objects composed of polygons are discernibly set to be a movable object which moves in the virtual three dimensional space or a fixed object which is fixed in the virtual three dimensional space or is in a constant position relationship with the virtual light source, and the image generating program further comprises a determining step for determining whether a target object to be processed is the fixed object or not, and only when it is determines that the object is the fixed object by the determining step, a mapping process for the diffuse reflection and the shadow is performed by using the lighting information texture.

5. The image processing program of claim 4, wherein, when the specular reflection is generated, whether a portion in the lighting information texture which corresponds to a portion to which the specular reflection is generated is provided with the mask information or not is determined, if the portion is provided with the mask information, the processing for generating the specular reflection to the portion is not performed.

6. The image processing program of claim 4, wherein, when the specular reflection is generated, the specular reflection is generated by a processing using image based lighting with high dynamic range information.

* * * * *